(12) United States Patent
Stiles

(10) Patent No.: US 10,104,970 B1
(45) Date of Patent: Oct. 23, 2018

(54) SEATING CUSHION

(71) Applicant: L&P Property Management Company, South Gate, CA (US)

(72) Inventor: Ronald D. Stiles, Carthage, MO (US)

(73) Assignee: l&P Property Management Company, South Gate, CA (US)

( * ) Notice: Subject to any disclaimer, the term of this patent is extended or adjusted under 35 U.S.C. 154(b) by 0 days.

(21) Appl. No.: 15/636,026

(22) Filed: Jun. 28, 2017

(51) Int. Cl.
*A47C 7/34* (2006.01)
*A47C 7/35* (2006.01)

(52) U.S. Cl.
CPC . *A47C 7/34* (2013.01); *A47C 7/35* (2013.01)

(58) Field of Classification Search
CPC .................................. A47C 7/34; A47C 7/35
USPC ............. 297/452.48, 452.49, 452.5, 452.51
See application file for complete search history.

(56) References Cited

U.S. PATENT DOCUMENTS

| | | | | |
|---|---|---|---|---|
| 1,455,847 A * | 5/1923 | Meutsch | ................ | A47C 27/04 5/720 |
| 1,476,456 A * | 12/1923 | Meutsch | ............ | A47C 27/0456 5/654.1 |
| 1,747,374 A * | 2/1930 | MacInerney | ......... | A47C 27/062 5/655.8 |
| 2,048,979 A * | 7/1936 | Trotta | .................... | A47C 27/04 5/273 |
| 3,906,560 A * | 9/1975 | Bulloch, Jr. | ............ | A47C 27/04 297/452.51 X |
| 6,131,892 A * | 10/2000 | Stumpf | ................ | A47C 27/064 267/89 |
| 6,143,122 A * | 11/2000 | Mossbeck | ............ | A47C 27/064 156/291 |
| 6,173,464 B1 * | 1/2001 | McCune | ............... | A47C 27/064 267/91 |
| 6,256,820 B1 * | 7/2001 | Moser | .................. | A47C 27/062 267/166 |
| 6,272,706 B1 * | 8/2001 | McCune | ............... | A47C 27/064 267/91 |
| 6,367,881 B1 * | 4/2002 | Bullard | ................ | A47C 27/064 297/452.5 |
| 6,398,199 B1 * | 6/2002 | Barber | ................. | A47C 27/064 267/93 |
| 6,692,080 B1 * | 2/2004 | Bullard | .................. | A47C 7/342 297/452.5 |
| 6,829,798 B2 * | 12/2004 | Wells | ..................... | A47C 27/07 5/655.8 |
| 8,302,229 B1 | 11/2012 | Bullard et al. | | |
| 8,667,630 B2 | 3/2014 | Bullard | | |
| 8,671,483 B2 | 3/2014 | Bullard et al. | | |

(Continued)

*Primary Examiner* — Rodney B White
(74) *Attorney, Agent, or Firm* — Wood, Herron & Evans, LLP

(57) ABSTRACT

A seating cushion with a pocketed spring assembly includes a plurality of interior strings of springs joined to each other. The interior strings of springs comprises a plurality of interconnected pockets. Each pocket contains at least one coil spring. The pocketed spring assembly forms a central matrix. The pocketed spring assembly further includes at least one perimeter string of springs. Each perimeter string of springs comprises a plurality of interconnected perimeter pockets. Each pocket of the central matrix has a maximum diameter or width of a first dimension and each pocket of the perimeter string of springs has a maximum diameter or width of a second dimension. The first dimension is greater than the second dimension.

17 Claims, 12 Drawing Sheets

(56) References Cited

U.S. PATENT DOCUMENTS

| | | | |
|---|---|---|---|
| 8,978,183 B1* | 3/2015 | Richmond | A47C 27/062 |
| | | | 5/655.8 |
| 9,332,856 B2* | 5/2016 | Eigenmann | A47C 27/064 |
| 9,345,334 B2* | 5/2016 | Mossbeck | A47C 27/064 |
| 9,370,252 B2 | 6/2016 | Eigenmann et al. | |
| 9,380,883 B1 | 7/2016 | Mossbeck | |
| 9,414,692 B2* | 8/2016 | Mossbeck | A47C 27/064 |
| 9,427,090 B2* | 8/2016 | Mossbeck | A47C 27/053 |
| 9,775,442 B2* | 10/2017 | Mossbeck | A47C 27/064 |
| 9,913,538 B2* | 3/2018 | Andreotti | A47C 7/20 |
| 2004/0172767 A1* | 9/2004 | Mossbeck | A47C 27/063 |
| | | | 5/720 |
| 2005/0097676 A1* | 5/2005 | Rensink | A47C 27/001 |
| | | | 5/721 |
| 2016/0166076 A1* | 6/2016 | Mossbeck | A47C 27/064 |
| | | | 297/452.5 X |

* cited by examiner

SEATING CUSHION

TECHNICAL FIELD

The present invention generally relates to seating products such as furniture cushions and other items related to upholstered furniture, as well as vehicle seats. More specifically, the invention relates to pocketed spring assemblies used in seating cushions together with other components that make up the entirety of the seating product.

BACKGROUND

Spring assemblies comprising pocketed coil springs are commonly used in seating or bedding products. Such pocketed spring assemblies are commonly made of multiple strings or rows of individually pocketed coil springs. Adjacent strings of individually pocketed coil springs are joined together by gluing or otherwise attaching the fabric of the strings of springs to each other. Pocketed coil springs are often referred to as a Marshall construction in which each coil spring is encased within its own fabric sack or pocket. The sack or pocket is typically defined between two plies of fabric strip connected together at intervals along transverse lines of attachment spaced along the strip. Pocketed spring assemblies are often supported by foam structure, such as by being inserted into a partial foam encasement or "bucket" as the term is used in the art. One or more upper layers of foam and/or other material may be located on top of the "bucket" to complete the foam encasement. Other constructions are also used to complete the product based on the inner pocketed spring assembly.

In order to provide edge support and reduce the amount of foam used in bedding products, Leggett & Platt of Carthage, Mo. has previously developed and sold a high density pocket coil border under the tradename Quantum Edge to replace foam borders. In this bedding product or mattress, interior coils formed in a central matrix of strings of coil springs have a larger diameter than outermost side coil springs that completely or at least partially surround the interior matrix of pocketed coil springs. The smaller diameter perimeter coils therefore provide border or edge support.

It is therefore an objective of this invention to provide a seating product that reduces the amount of foam used in the product and adds modularity or variability to the design of the pocketed spring assemblies used in the seating product, for various reasons specific to the use and construction of such seating products.

SUMMARY

A first illustrative embodiment of the invention comprises a seating cushion with a pocketed spring assembly including a plurality of interior strings of springs joined to each other. Each of the interior strings of springs comprises a plurality of interconnected pockets. Each of the pockets comprises a coil spring encased in fabric. The pocketed spring assembly forms a central matrix of interconnected pockets. The plurality of interior strings of springs are comprised of linear arrays of the strings of springs fixed together in side-by-side relation. The pocketed spring assembly further includes at least one perimeter string of springs. Each perimeter string of springs comprises a plurality of interconnected perimeter pockets, each perimeter pocket comprising a coil spring encased in fabric. Each pocket of the central matrix has a maximum diameter or width of a first dimension and each pocket of the perimeter string of springs has a maximum diameter or width of a second dimension, and the first dimension is greater than the second dimension. The cushion further includes cushioning material on at least one side of the pocketed spring assembly and a covering encasing the pocketed spring assembly and cushioning material.

The perimeter pockets may have the same height as the pockets of the central matrix or may have a different height than the height of the pockets of the central matrix. In various embodiments, the perimeter pockets have a greater height than the height of the pockets of the central matrix. In various embodiments, the pockets of the central matrix have a greater height than the height of perimeter pockets. Generally, perimeter pockets of differing heights relative to each other and/or relative to the central matrix pockets may be used to achieve various desired contouring and firmness effects. One or more perimeter strings of springs may or may not surround the central matrix. The seating cushion may further comprise at least one scrim sheet for at least partially encasing the pocketed spring assembly and securing the strings in place.

In another embodiment, a seating cushion comprises a pocketed spring assembly which includes a plurality of interior strings of springs joined to each other. Each of the interior strings of springs comprises a plurality of interconnected pockets. Each of the pockets comprises a coil spring encased in fabric. The pocketed spring assembly forms a central matrix of interconnected pockets and includes the plurality of interior strings of springs comprised of linear arrays of the strings of springs fixed together in side-by-side relation. The pocketed spring assembly further includes at least two perimeter strings of springs extending side-by-side respectively along at least two opposite edges of the central matrix. Each perimeter string of springs comprises a plurality of interconnected perimeter pockets. Each perimeter pocket comprises a coil spring encased in fabric, wherein each pocket of the central matrix has a maximum diameter or width of a first dimension and each pocket of the perimeter string of springs has a maximum diameter or width of a second dimension. The first dimension is greater than the second dimension. The two perimeter strings of springs extending along respective opposite edges of the central matrix comprise respective strings of springs having different heights. The cushion further includes cushioning material on at least one side of the pocketed spring assembly and a covering encasing the pocketed spring assembly and cushioning material.

At least one of the perimeter string of springs may surround the central matrix. At least one of the perimeter strings of springs extending along each side of the central matrix may have a different height than the height of the strings of springs of the central matrix. At least one of the perimeter strings of springs extending along at least one of the opposite edges of the central matrix more specifically may have a greater or lesser height than the height of the strings of springs of the central matrix. The pockets of the central matrix may have a greater height than the height of at least one of the perimeter strings of springs extending along at least one of the opposite edges of the central matrix. The perimeter pockets may or may not surround the central matrix and pockets of the central matrix may have a greater height than the height of one or more sections of the perimeter pockets. At least one scrim sheet may be used for at least partially encasing the pocketed spring assembly and securing the strings in place.

Yet another illustrative embodiment provides a seating cushion, comprising a pocketed spring assembly with a plurality of interior strings of springs joined to each other.

Each of the interior strings of springs comprises a plurality of interconnected pockets. Each of the pockets comprises a coil spring encased in fabric. The pocketed spring assembly forms a central matrix of interconnected pockets including the plurality of interior strings of springs comprised of linear arrays of the strings of springs fixed together in side-by-side relation. The pocketed spring assembly further includes at least three perimeter strings of springs extending side-by-side respectively along a front edge of the central matrix. The perimeter strings of springs each comprises a plurality of interconnected perimeter pockets. Each perimeter pocket comprises a coil spring encased in fabric, wherein each pocket of the central matrix has a maximum diameter or width of a first dimension and each pocket of the perimeter strings of springs has a maximum diameter or width of a second dimension. The first dimension is greater than the second dimension. One of the three perimeter strings of springs has a height greater than the other two perimeter strings of springs. The cushion further includes cushioning material on at least one side of the pocketed spring assembly and a covering encasing the pocketed spring assembly and cushioning material. The three perimeter strings of springs may further comprise first and second strings of springs sandwiching a third, middle string of springs. The middle string of springs has a greater height than the first and second strings of springs.

These and other objects and advantages of the present invention shall be made apparent from the accompanying drawings and the description thereof

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, explain the principles of the present invention.

DETAILED DESCRIPTION

Figure 1:
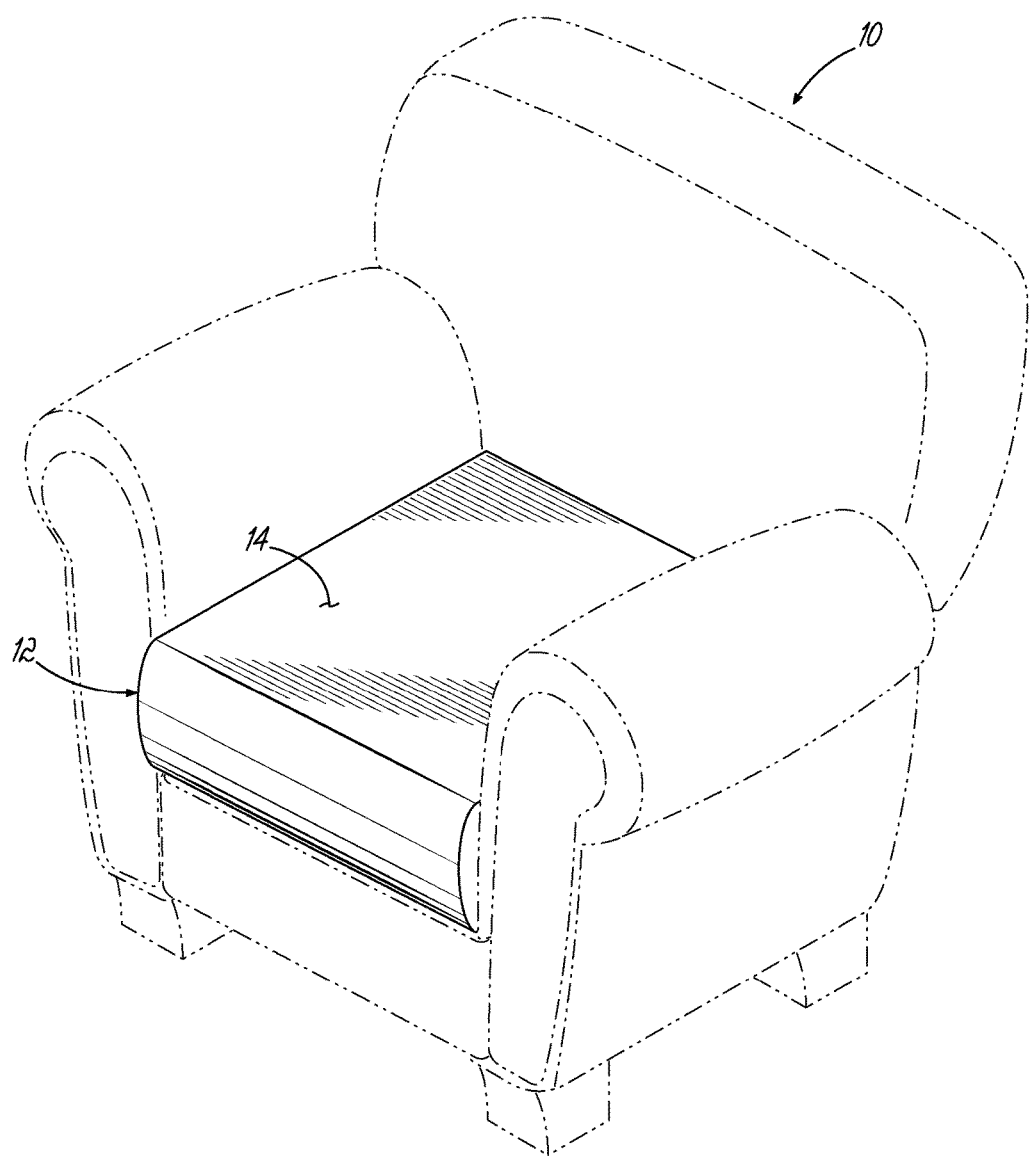
FIG. 1 is a perspective view illustrating an item of furniture, specifically an upholstered chair shown in dash-dot lines, including a seat cushion formed in accordance with principles of the present invention.

In the description of multiple embodiments to follow, like reference numerals used in each of the figures refer to like elements of structure and corresponding function. Therefore, to reduce repetition, written description of such elements of structure generally will not be repeated herein.

Figure 2:
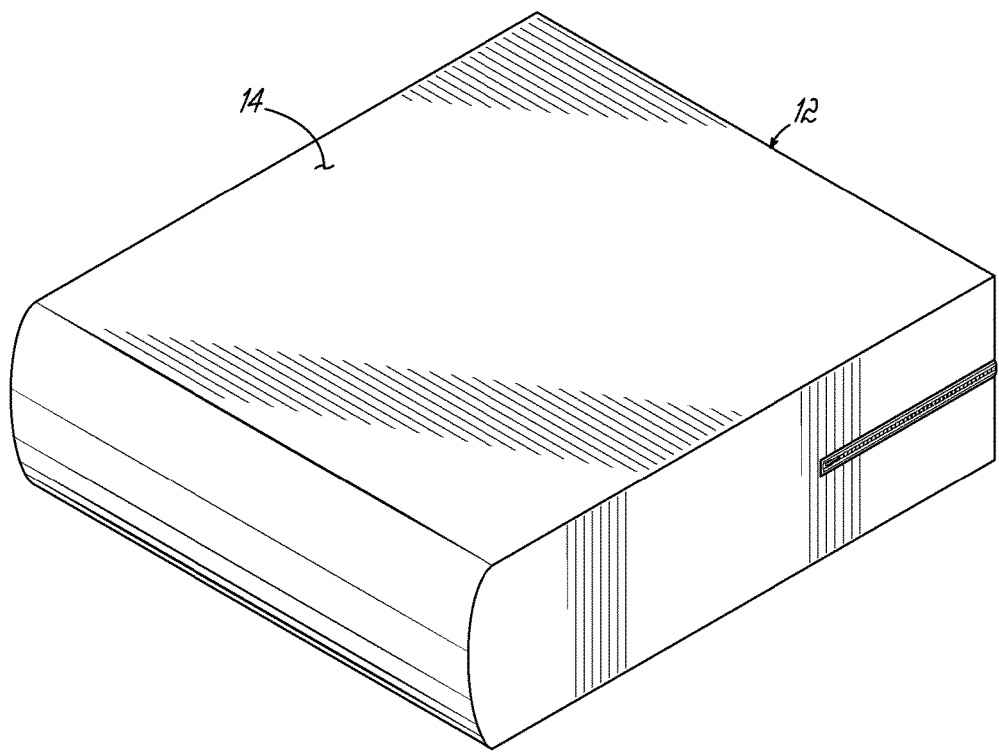
FIG. 2 is a perspective view of the furniture seat cushion illustrated in FIG. 1.

Referring first to the illustrative embodiment of FIGS. 1-3, 3A, 4 and 5, a seating product is shown in the form of an upholstered chair 10 including a seat cushion 12, wherein the seat cushion 12 is manufactured and formed in accordance with certain principles of the invention. As shown in FIGS. 1 and 2, the seat cushion 12 comprises an outer covering 14, which may be constructed of any suitable fabric, leather, vinyl or other material used for such furniture cushions. The outer covering 14 has been removed in FIG. 3 to reveal the general construction of the inner support structure. The inner support structure comprises a pocketed spring assembly 20 including a plurality of interior or central strings of springs 22 joined to each other. Each of the interior strings of springs 22 comprises a plurality of interconnected pockets 22a and each of the pockets 22a comprises at least one coil spring 24a encased in fabric 24b. See FIG. 3A. The pocketed spring assembly 20 comprises a central matrix 26 of interconnected pockets 22a including the plurality of interior strings of springs 22 comprised of linear arrays of the strings of springs 22 fixed together in side-by-side relation to form the matrix 26, as also best shown in FIG. 3.

The pocketed spring assembly 20 further includes opposite edges each comprised of perimeter strings of springs 30. Each perimeter string of springs 30 comprises a plurality of interconnected perimeter pockets 30a each encasing a coil spring 32a in fabric 32b similar to the interior pockets 22a. As further shown in FIG. 3A, each pocket 22a of the central matrix 26 has a maximum diameter or width of a first dimension "D" and each pocket 30a of the perimeter strings of springs 30 has a maximum diameter or width of a second dimension "d". The first dimension, i.e., the width or diameter dimension "D" of the interior pockets 22a is greater than the second dimension, i.e., the diameter or width dimension "d" of the perimeter pockets 30a. In each of the embodiments shown and described herein, the specific dimensions of each component may vary according to the needs of the application. However, generally the maximum widthwise or diametrical dimension "D" of the interior pockets 22a and the maximum dimension "d" of the perimeter pockets 30a will have at least approximately a 1.5:1 ratio. In the illustrated embodiments, this ratio is approximately 2:1. The pockets 22a, 30a of both the interior matrix and the perimeter are generally shown as cylindrical in shape. However, it will be appreciated that the coil springs 24a, 32a and resulting pockets 22a, 30a may be formed in any desired shape, such as other conventional square, hourglass, or barrel shapes.

Figure 3:
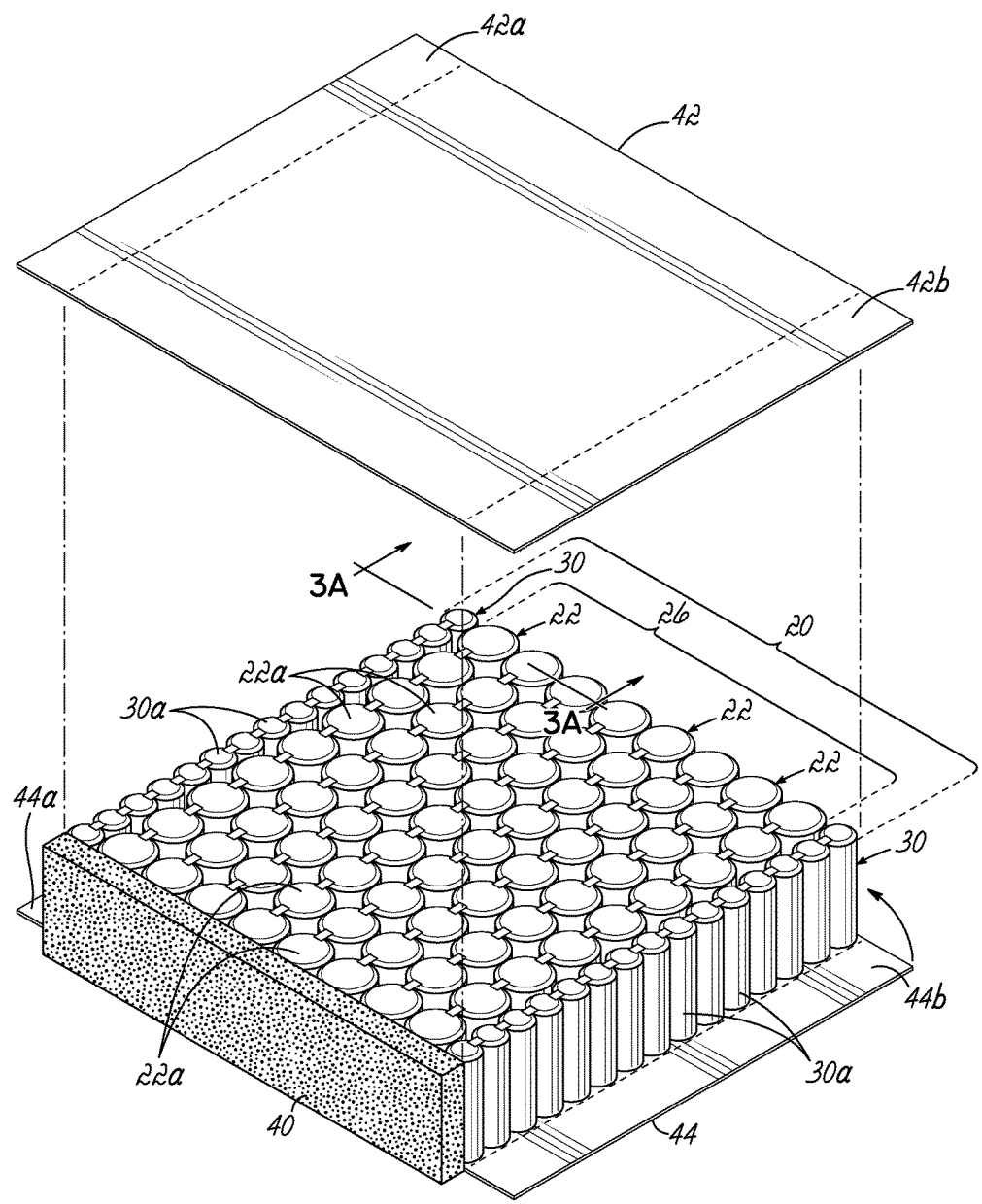
FIG. 3 is an exploded perspective view of interior components of the furniture seat cushion shown in FIG. 2, including a central or interior coil spring assembly comprising a matrix of strings of coil springs, as well as border or perimeter pocketed coil springs, upper and lower scrim sheets and a front section of supporting foam.
Figure 3A:
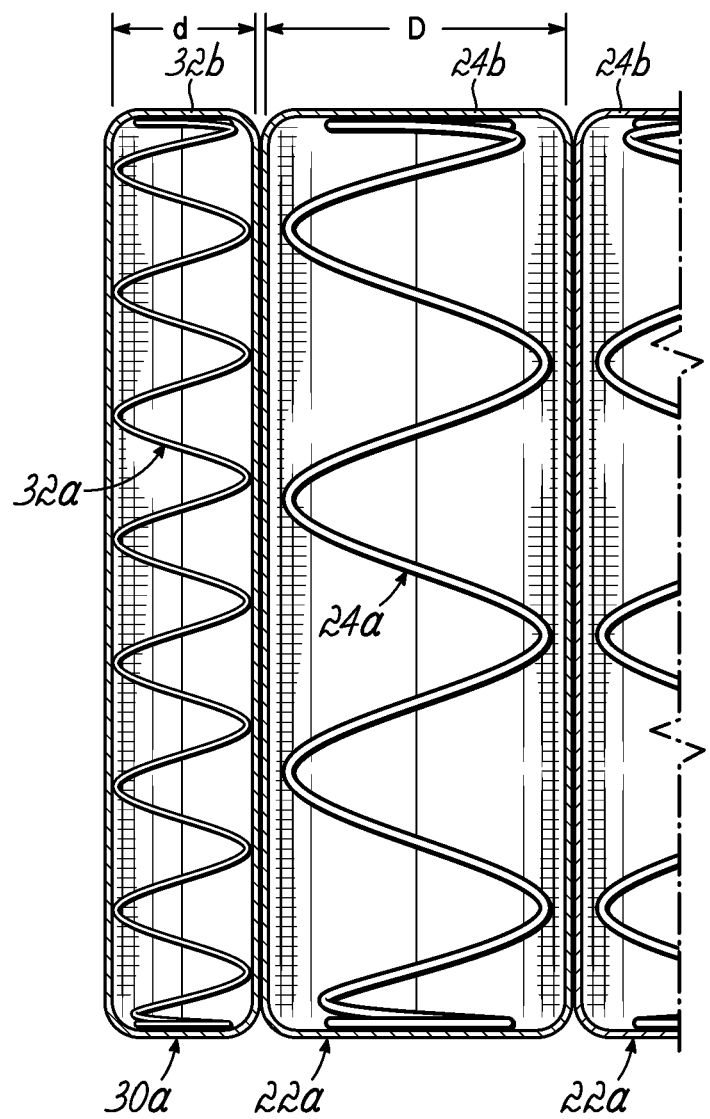
FIG. 3A is a cross sectional view taken along line 3A-3A of FIG. 3.
Figure 4:
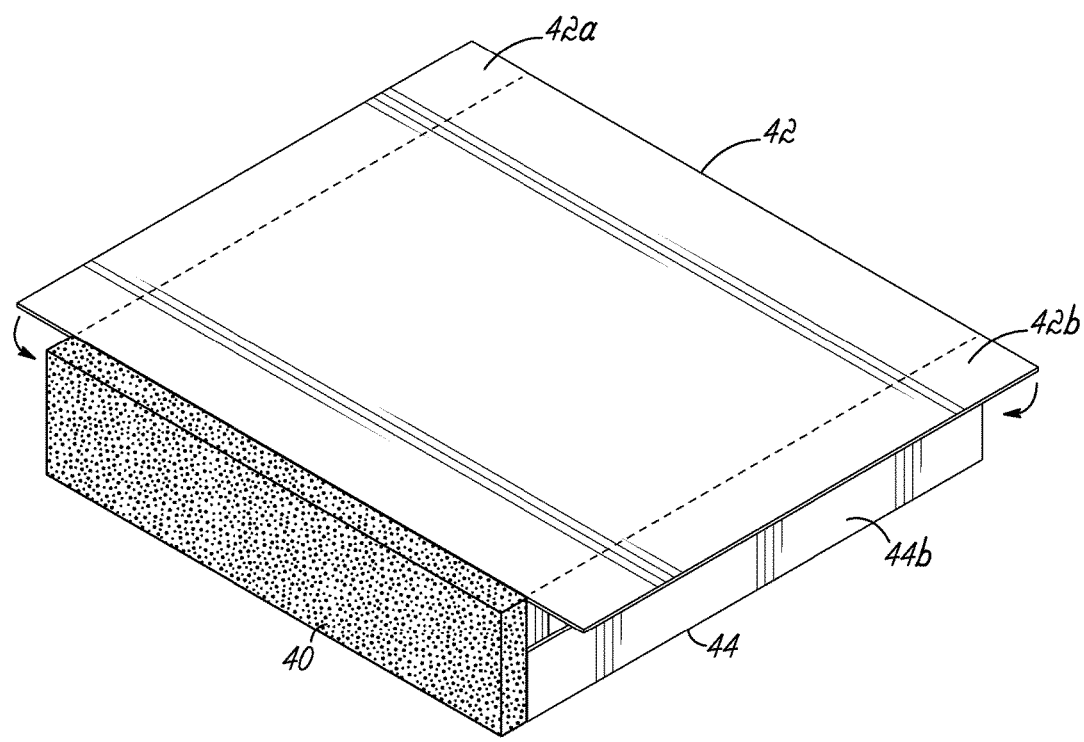
FIG. 4 is a perspective view illustrating a more fully assembled state of the seat cushion shown in FIG. 3.
Figure 5:
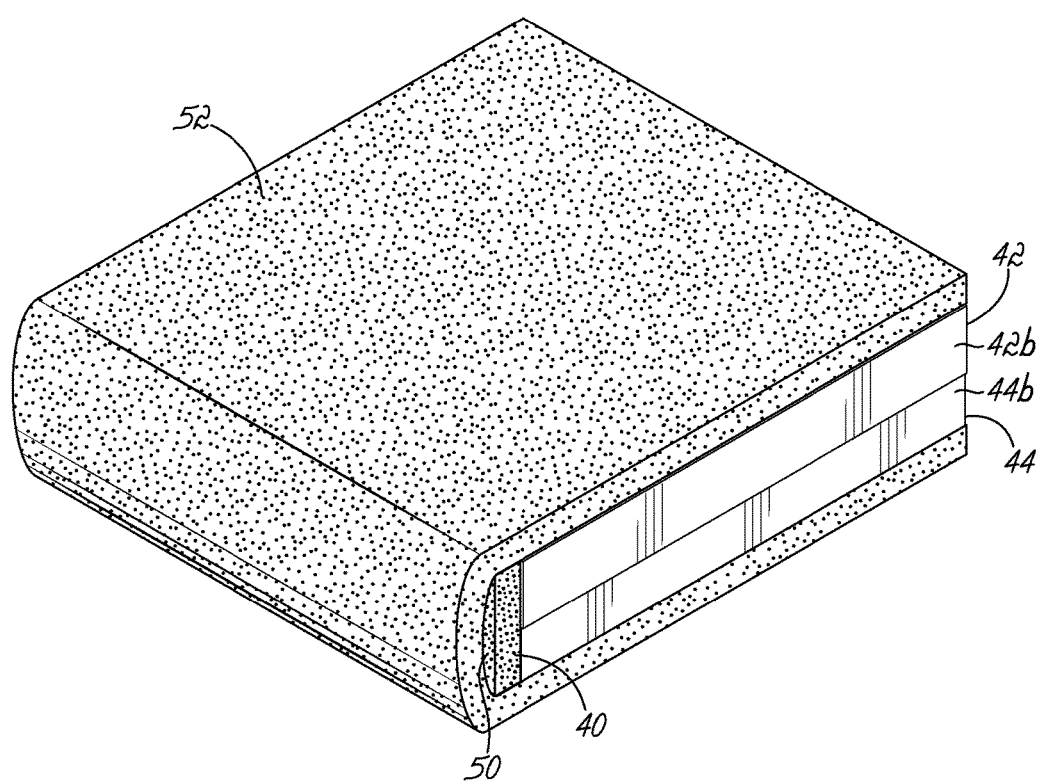
FIG. 5 is a perspective view illustrating the optional use of a "bullnose" piece of foam wrapped around upper, front, and lower surfaces of the construction generally shown in FIG. 4.

This first embodiment further includes at least one front piece of foam 40, as shown in FIG. 3, secured to the front faces of the interior matrix pockets 22a as well as the forward most pocket 30a of each of the perimeter strings of springs 30. An upper scrim sheet 42, which may be formed of nonwoven fabric is applied to the top surface of the pocketed spring assembly 20 and has a pair of flaps 42a, 42b that extend over the respective perimeter strings of springs 30. Likewise, a bottom scrim fabric sheet 44 is applied to the lower surfaces of the central or interior matrix 26 and the perimeter strings of springs 30 and likewise has a pair of side flaps 44a, 44b that extend upwardly to meet the downward extending flaps 42a, 42b as shown in FIG. 4. These scrim sheets 42, 44 may be suitably fixed, such as by gluing the scrim sheets 42, 44 to the respective fabric pocket surfaces of the interior matrix 26 and the perimeter strings of springs 30. As further shown in FIG. 5, another piece of foam 50 may be secured or fixed as by gluing to the first piece of foam 40 and then a final piece of foam 52 may be wrapped in a bullnose fashion at the front of the cushion 12 to extend over an outer surface of the upper scrim sheet 42 and an outer surface of the lower scrim sheet 44 as shown in FIG. 5. Again, the foam piece 52 may be fixed to the scrim sheets 42, 44 by glue.

Figure 6:
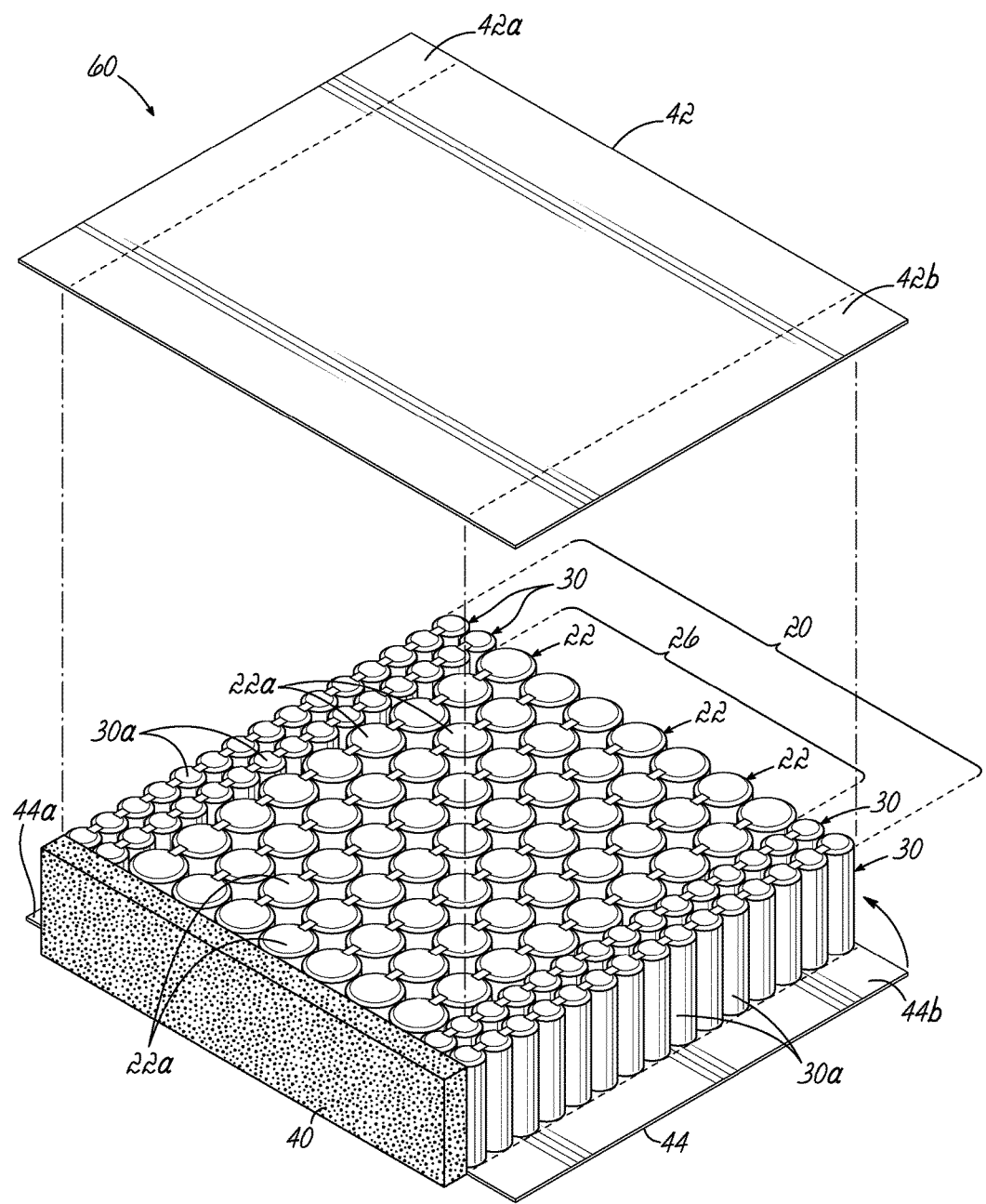
FIG. 6 illustrates an exploded perspective view similar to FIG. 3, but illustrating another illustrative embodiment including two rows or strings of springs at opposite side edges of the central matrix of pocketed coil springs.

FIG. 6 illustrates another core structure 60 for a seat cushion (not shown), in accordance with another illustrative embodiment. It will be appreciated that in various embodiments shown herein, finishing components such as the foam 40, 50, the scrim sheets 42, 44, and the outer covering 14, as shown in the first embodiment, are removed for clarity. However, to complete a seat cushion, it will be understood that each embodiment shown and described herein will include such finishing components, and they will be preferably incorporated into a seating product. In addition, it will be appreciated from a review of the drawings that the perimeter pockets 30a have a smaller width or diameter dimension than the interior or matrix pockets 22a in each embodiment, as more specifically described above, although for conciseness this feature is not explicitly repeated when describing each embodiment. The supporting core structure of this second embodiment is similar to that shown in FIGS. 1-5, but includes a second row or string of perimeter pockets 30a on each of the opposite sides of the central matrix 26. This, for example, can provide additional edge support along the sides of the cushion 60 and can allow for other design features such as contouring to be discussed below. In all other respects, the construction of the seat cushion 60 may be the same as described above in regard to FIGS. 1-5.

Figure 7:
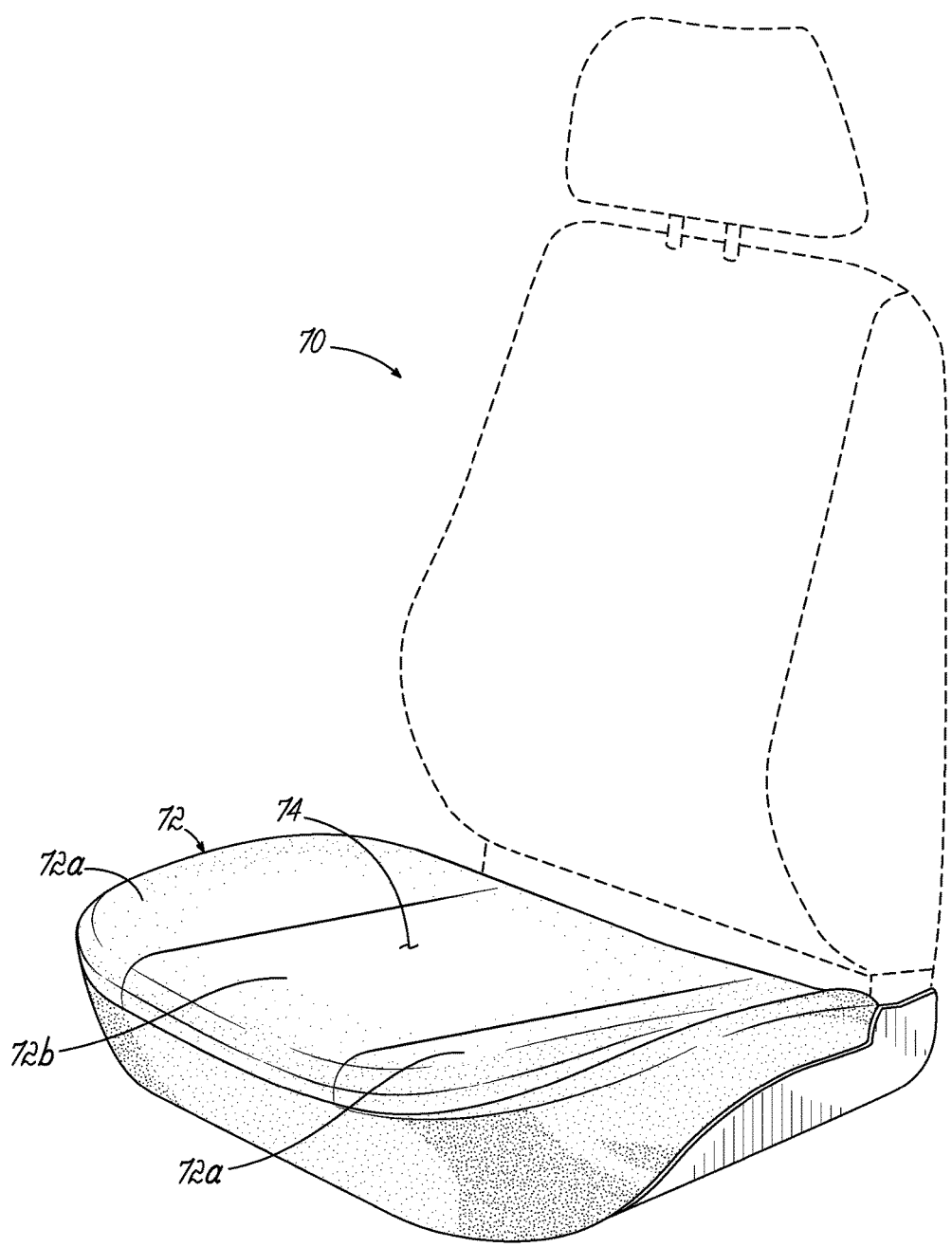
FIG. 7 illustrates a typical bucket seat for use in a vehicle, furniture seat including motion furniture or reclining chair, for example, that utilizes a cushion structure formed in accordance with the principles of the present invention.
Figure 8A:
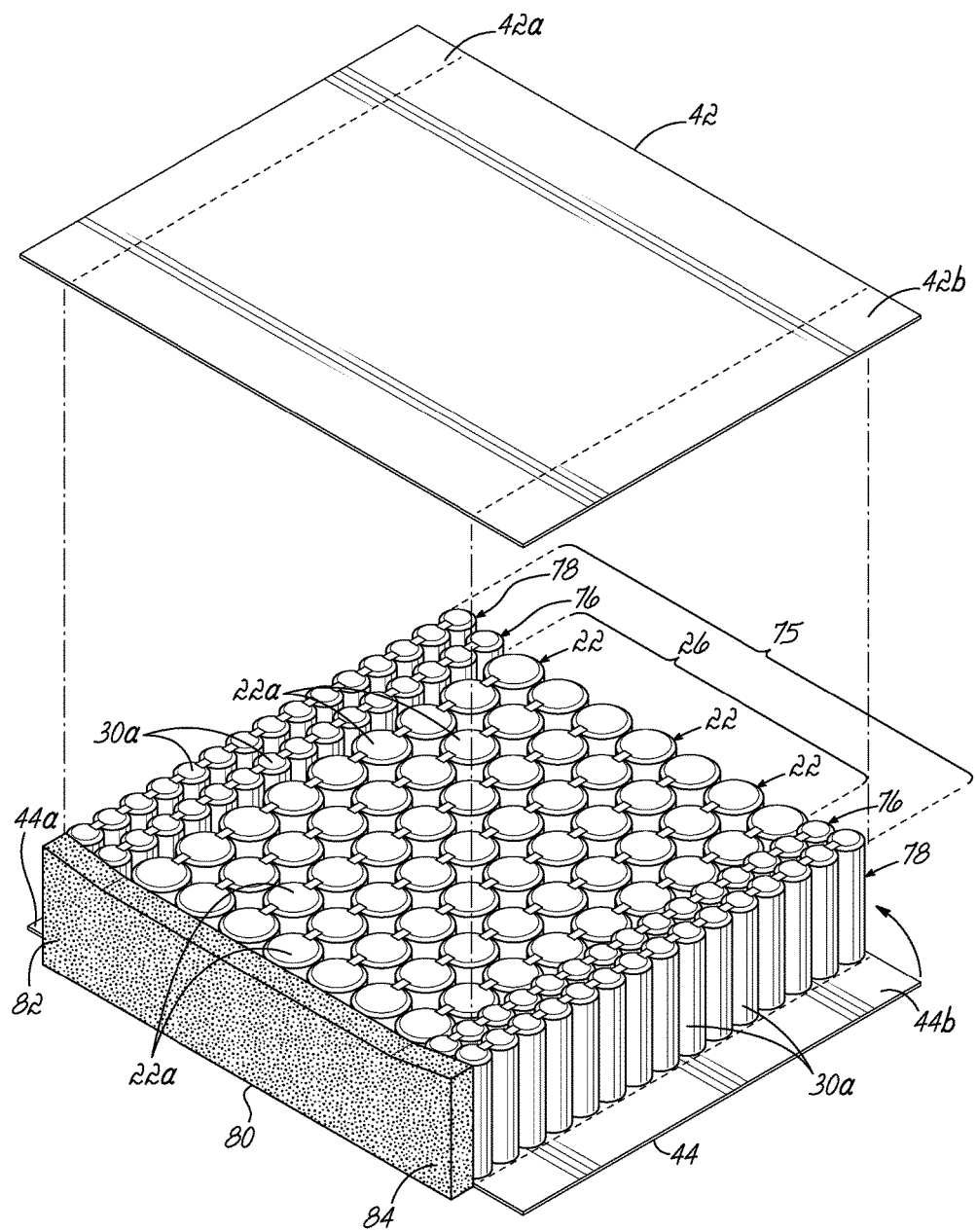
FIG. 8A is an exploded perspective view similar to FIG. 6, but illustrating a varying height to the perimeter strings of springs to form the shape of a seat cushion for use in a typical bucket seat as shown in FIG. 7.

FIGS. 7 and 8A respectively illustrate a "bucket" type seat 70, for use in a vehicle, furniture seat including motion furniture or reclining chair, for example, and a construction of a seat cushion 72 for the bucket seat 70 that is in accordance with another embodiment of the invention. As with the first embodiment, the bucket seat 70 will have a desired outer covering 74. More specifically referring to FIG. 8A, a pocketed spring assembly 75 of the seat cushion 72 is similar to that shown in FIG. 6, however, the perimeter strings of springs 30 on opposite edges of the assembly 75 have a different height relative to the interior or central matrix 26 of the pocketed spring assembly 75. As shown in FIG. 8A, the first row 76 of each perimeter string of springs 30 on opposite sides of the central matrix 26 comprises pocketed coil springs 30a of a greater height than the pocketed coils 22a in the central matrix 26. The second row 78 or outermost rows of the perimeter pocketed coil springs 30a have a height even greater than the first row 76 of the perimeter strings of springs 30. This design allows the assembly 75 and resulting seat cushion 72 to be formed in the generally concave shape as shown in FIG. 7 with first and second side support regions 72a that gradually raise in height in an outward, transverse direction relative to the seat cushion 72 and, specifically, relative to a central region 72b of the seat cushion 72 for supporting the legs and hips of the seat occupant. As further shown in FIG. 8A, a front piece of foam 80 may be used with contouring along the respective first and second end regions 82, 84 that corresponds to the contouring of the pocketed spring assembly 75 as described. Likewise, any further foam or support materials may also be contoured appropriately to better conform to the upper surface contour of the pocketed spring assembly 75.

Figure 8B:
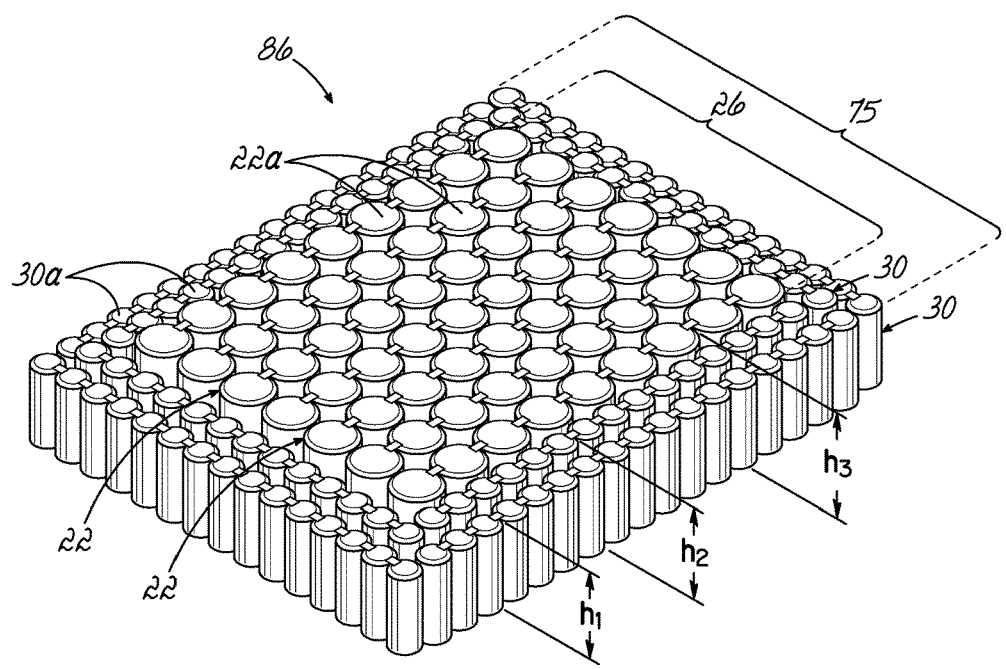
FIG. 8B is a perspective view illustrating another alternative embodiment for a pocketed spring assembly, including a central matrix of springs having a greater height than perimeter, smaller diameter springs to form a "crown" effect for a seat cushion, such as a furniture seat cushion.

FIG. 8B illustrates a pocketed coil spring assembly 86 for a seat cushion (not shown) similar to that shown in other embodiments, however, this assembly 86 includes a central matrix 26 of pocketed coil springs 22a surrounded by one or more perimeter strings of springs 30. The surrounding perimeter strings of springs 30 may be formed from a single string of springs or from separate strings of springs that have been suitably secured together and/or secured to the central matrix 26 in surrounding relation as shown. In this embodiment, a "crowned" construction has been formed by using pocketed coil springs 22a in the central matrix 26 of a first height and perimeter strings of springs 30 of respective second and third heights that are less than the first height. In this embodiment, the outermost string(s) of springs 30 have the lowest height $h_1$, while the innermost perimeter string(s) of springs 30 have a height $h_2$ greater than the height $h_1$ of the outermost perimeter pockets 30a but less than the height $h_3$ of the interior, central matrix 26 of pocketed coils 22a. In all other respects, and as with all other embodiments, this pocketed spring assembly 86 may be used in seating products as set forth herein to form desired seat cushions or other seating products for furniture or other uses.

Figure 8C:
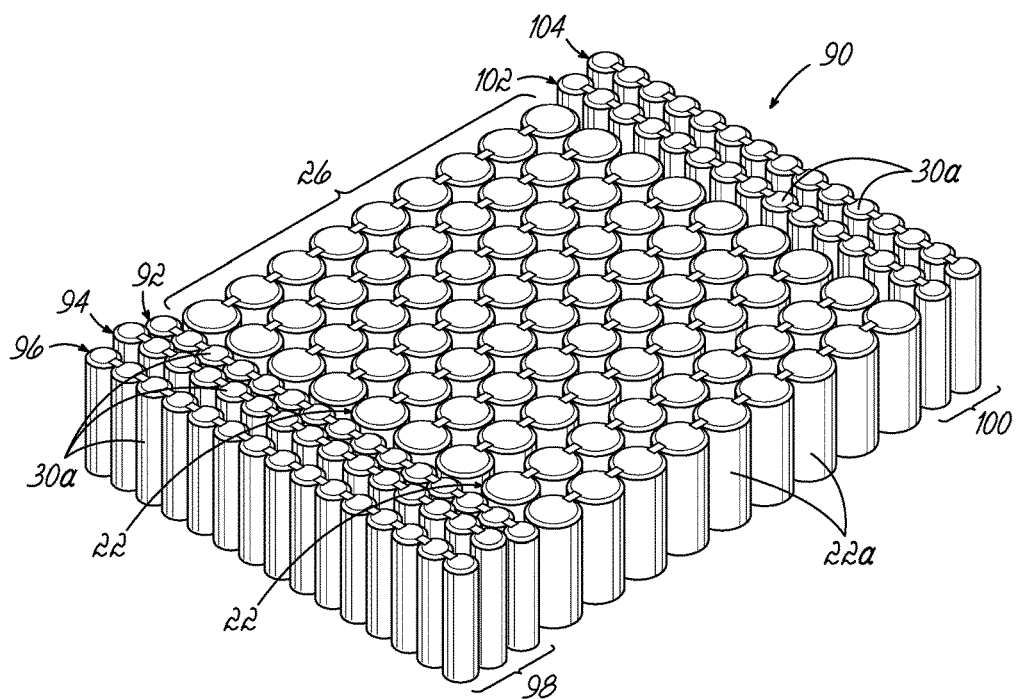
FIG. 8C is a perspective view similar to FIG. 8B, but illustrating another illustrative embodiment having front and rear smaller diameter, perimeter coils of varying height relative to the interior matrix of coils to achieve another alternative contouring effect for a seat cushion.

FIG. 8C illustrates another embodiment of a pocketed spring assembly 90 including a plurality of interior strings of coil springs 22 joined to each other to form a central matrix 26 and respective front perimeter strings of springs 30 and rear perimeter strings of springs 30 for desired contouring effects. In this embodiment, the front perimeter section of perimeter pocketed coils 30a comprises a first string of springs 92, a second string of springs 94 and a third string of springs 96. The second perimeter string of springs 94 is sandwiched between the first and third strings of springs 92, 96 and is formed with a greater height than the first and third perimeter strings of springs 92, 96. This forms a front cushion or seat section 98 with a raised, transversely extending central region relative to adjacent forward and rearward sections to provide support and yet comfort at the knee region of the seat occupant. The rear section 100 of the cushion or pocketed spring assembly 90 includes perimeter strings of springs 30 that are formed with a greater height than the pocketed coil springs 22a of the central matrix 26.

In this embodiment, the height of the rear, perimeter section 100 is raised gradually in a rearward direction and this is accomplished by providing a first row 102 of pocketed springs 30a of a first height and a second row or string 104 of a second height wherein the first height is less than the second height. The first height may, as shown, also be greater than the height of the pockets 22a in the central matrix 26. It will be appreciated that any desired contouring may be formed and achieved other than the examples shown herein and that the various manners of providing contouring, as described herein, may be combined for achieving different effects. For example, the front foam piece 80 shown in FIG. 8A may be removed and replaced by two or more small diameter perimeter strings of springs 30, such as the construction shown in FIG. 8C. In addition, or alternatively, the side bolstering, perimeter strings of springs 30 shown in FIG. 8A may be added to the pocketed spring assembly 90 shown in FIG. 8C. Many other embodiments and options for contouring and adding side, front, and/or rear support to a cushion may be provided by using perimeter strings of springs 30 in addition to those specifically shown and described herein.

Figure 9:
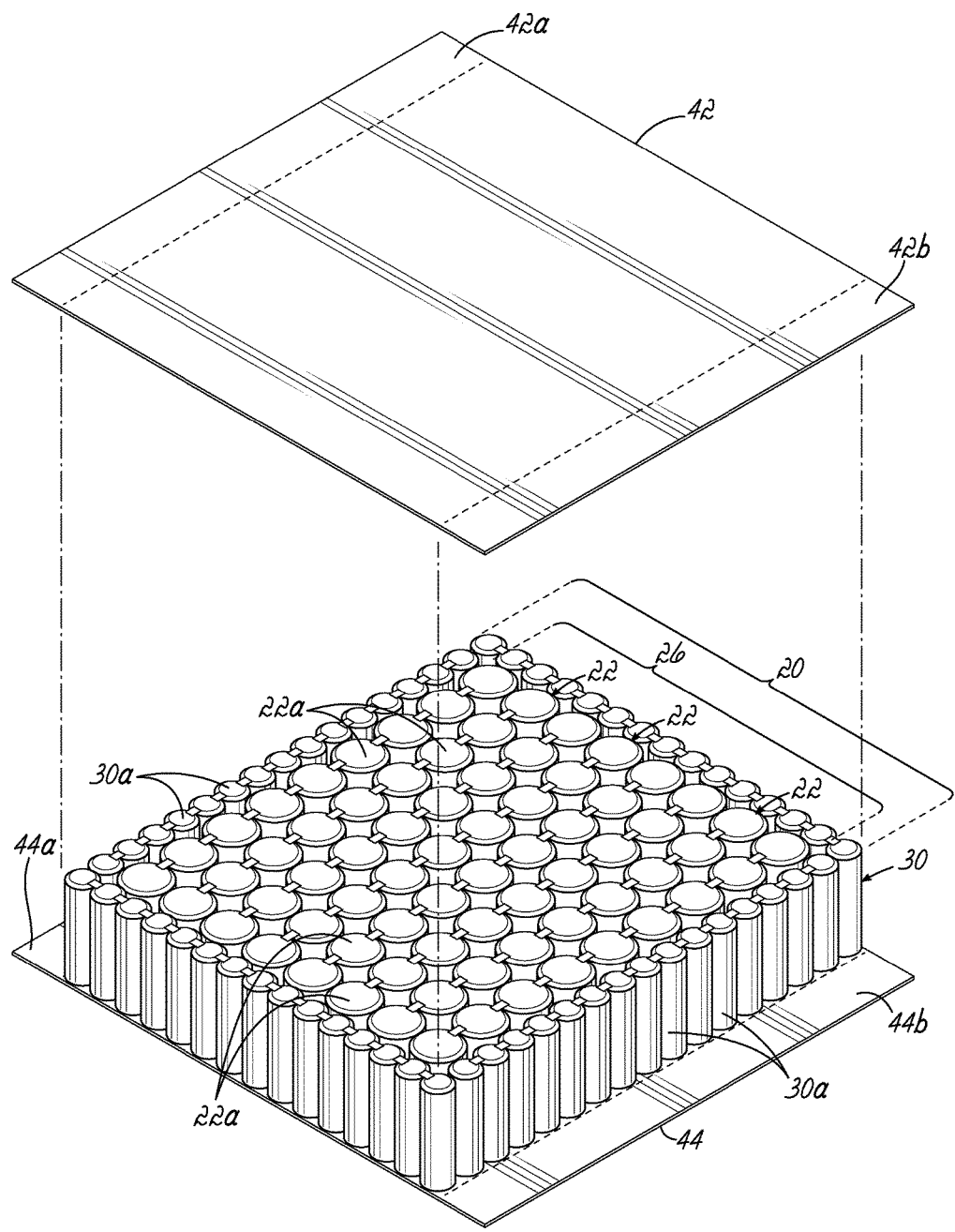
FIG. 9 is an exploded perspective view similar to FIG. 3, but illustrating another embodiment in which a perimeter string or strings of springs fully surrounds the central matrix of pocketed coil springs to provide edge support and reduce foam usage.
Figure 10:
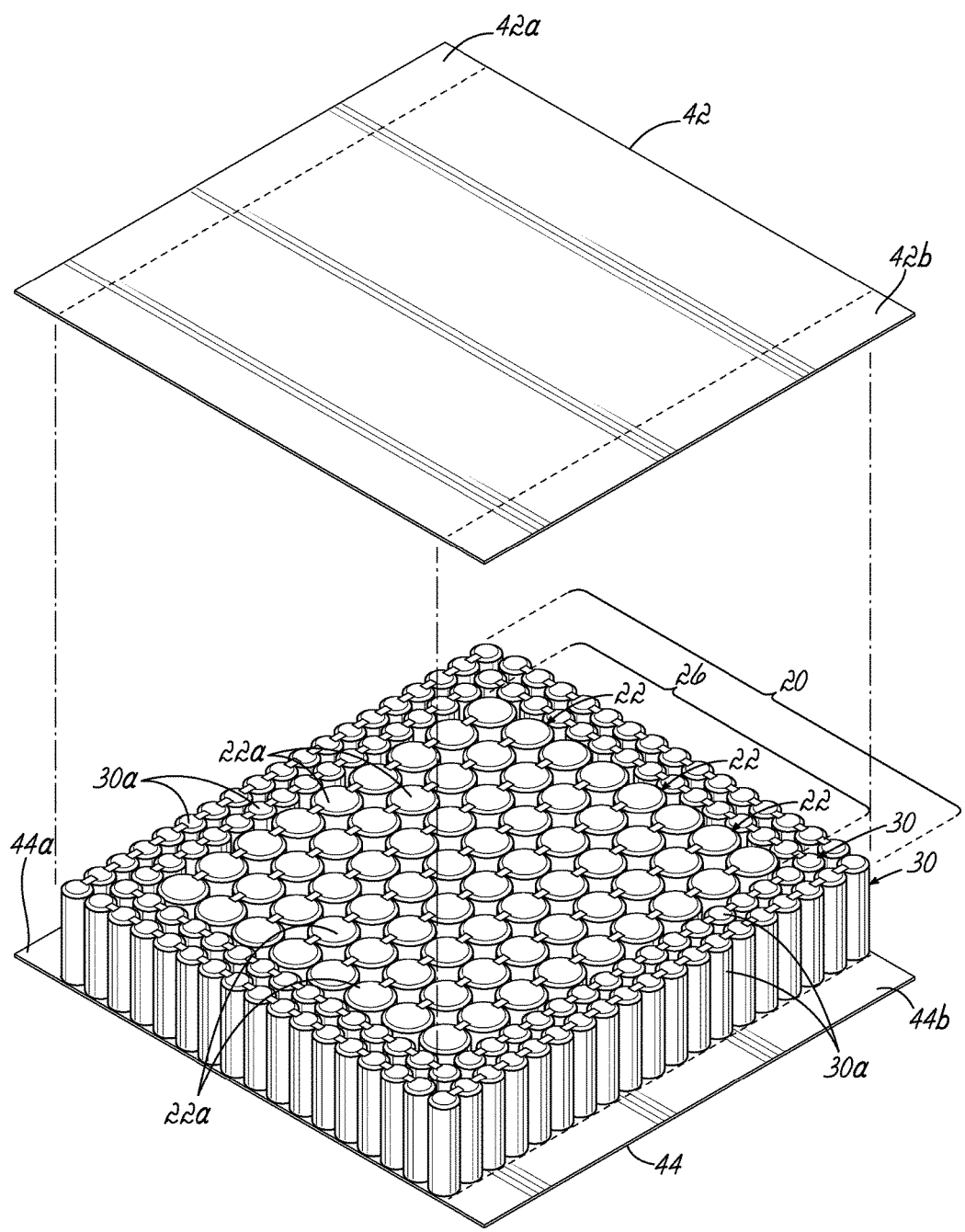
FIG. 10 is an exploded perspective view similar to FIG. 9, but illustrating another embodiment having two rows of smaller diameter strings of springs encasing or surrounding the central matrix of pocketed coil springs.

FIGS. 9 and 10 illustrate two additional embodiments in which a perimeter string of springs 30, or multiple perimeter strings of springs 30 are affixed in surrounding relation to a central matrix 26 of pocketed coils 22a. In the embodiment shown in FIG. 9, a single perimeter comprised of string(s) of springs 30 is provided in surround relation around the entire central matrix 26, whereas in the embodiment of FIG. 10, two rows of perimeter strings of springs 30 are provided and affixed in surrounding relation to the central matrix 26.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. The invention in its broader aspects is, therefore, not limited to the specific details, representative apparatus and method, and illustrative examples shown and described. Accordingly, departures may be made from such details without departing from the spirit or scope of the general inventive concept.

What is claimed is:

1. A seating cushion, comprising:
a pocketed spring assembly including a plurality of interior strings of springs joined to each other, each of the interior strings of springs comprising a plurality of interconnected pockets, each of the pockets comprising a coil spring encased in fabric, the pocketed spring assembly forming a central matrix of interconnected pockets including the plurality of interior strings of springs comprised of linear arrays of the strings of springs fixed together in side-by-side relation, the pocketed spring assembly further including at least first and second perimeter strings of springs, each perimeter string of springs comprising a plurality of interconnected perimeter pockets fixed together in side-by-side relation, each perimeter pocket comprising a coil spring encased in fabric, wherein each pocket of the central matrix has a maximum diameter or width of a first dimension and each pocket of the perimeter string of springs has a maximum diameter or width of a second dimension, and the first dimension is greater than the second dimension wherein the first and second perimeter strings of springs respectively extend along first and second opposite sides of the pocketed spring assembly;
foam cushioning material oriented vertically on at least a front side of the pocketed spring assembly and extending from the first side to the second side; and
a covering encasing the pocketed spring assembly and cushioning material.

2. The seating cushion of claim 1 wherein the perimeter pockets have the same height as the pockets of the central matrix.

3. The seating cushion of claim 1 wherein the perimeter pockets have a different height than the height of the pockets of the central matrix.

4. The seating cushion of claim 3 wherein the perimeter pockets have a greater height than the height of the pockets of the central matrix.

5. The seating cushion of claim 3 wherein the pockets of the central matrix have a greater height than the height of the perimeter pockets.

6. The seating cushion of claim 1 wherein the perimeter string of springs surrounds the central matrix.

7. The seating cushion of claim 1, further comprising at least one scrim sheet for at least partially encasing the pocketed spring assembly.

8. A seating cushion, comprising:
a pocketed spring assembly including a plurality of interior strings of springs joined to each other, each of the interior strings of springs comprising a plurality of interconnected pockets, each of the pockets comprising a coil spring encased in fabric, the pocketed spring assembly forming a central matrix of interconnected pockets including the plurality of interior strings of springs comprised of linear arrays of the strings of springs fixed together in side-by-side relation, the pocketed spring assembly further including at least two perimeter strings of springs extending side-by-side respectively along at least two opposite edges of the central matrix, each perimeter string of springs comprising a plurality of interconnected perimeter pockets, each perimeter pocket comprising a coil spring encased in fabric, wherein each pocket of the central matrix has a maximum diameter or width of a first dimension and each pocket of the perimeter string of springs has a maximum diameter or width of a second dimension, and the first dimension is greater than the second dimension, and wherein the two perimeter strings of springs extending along respective opposite edges of the central matrix comprise respective strings of springs having different heights;
cushioning material on at least one side of the pocketed spring assembly; and
a covering encasing the pocketed spring assembly and cushioning material.

9. The seating cushion of claim 8 wherein at least one of the perimeter strings of springs surrounds the central matrix.

10. The seating cushion of claim 8 wherein at least one of the perimeter strings of springs extending along each side of the central matrix has a different height than the height of the strings of springs of the central matrix.

11. The seating cushion of claim 8 wherein at least one of the perimeter strings of springs extending along at least one of the opposite edges of the central matrix has a greater height than the height of the strings of springs of the central matrix.

12. The seating cushion of claim 11 wherein the at least one of the perimeter strings of springs further comprises an outermost perimeter string of springs of the pocketed spring assembly.

13. The seating cushion of claim 8 wherein the pockets of the central matrix have a greater height than the height of at least one of the perimeter strings of springs extending along at least one of the opposite edges of the central matrix.

14. The seating cushion of claim 8 wherein the perimeter pockets surround the central matrix and the pockets of the central matrix have a greater height than the height of the perimeter pockets surrounding the central matrix.

15. The seating cushion of claim 8, further comprising at least one scrim sheet for at least partially encasing the pocketed spring assembly.

16. A seating cushion, comprising:
a pocketed spring assembly including a plurality of interior strings of springs joined to each other, each of the interior strings of springs comprising a plurality of interconnected pockets, each of the pockets comprising a coil spring encased in fabric, the pocketed spring assembly forming a central matrix of interconnected pockets including the plurality of interior strings of springs comprised of linear arrays of the strings of springs fixed together in side-by-side relation, the pocketed spring assembly further including at least three perimeter strings of springs extending side-by-side respectively along a front edge of the central matrix, the perimeter strings of springs each comprising a plurality of interconnected perimeter pockets, each perimeter pocket comprising a coil spring encased in fabric, wherein each pocket of the central matrix has a maximum diameter or width of a first dimension and each pocket of the perimeter strings of springs has a maximum diameter or width of a second dimension, and the first dimension is greater than the second dimension, and wherein one of the three perimeter strings of springs has a height greater than the other two perimeter strings of springs;
cushioning material on at least one side of the pocketed spring assembly; and
a covering encasing the pocketed spring assembly and cushioning material.

17. The seating cushion of claim 16, wherein the three perimeter strings of springs further comprise first and second strings of springs sandwiching a third, middle string of springs, wherein the third, middle string of springs has a greater height than the first and second strings of springs.

\* \* \* \* \*